April 29, 1947. W. L. PAUL 2,419,589
LEAKPROOF DRY CELL
Filed May 6, 1944
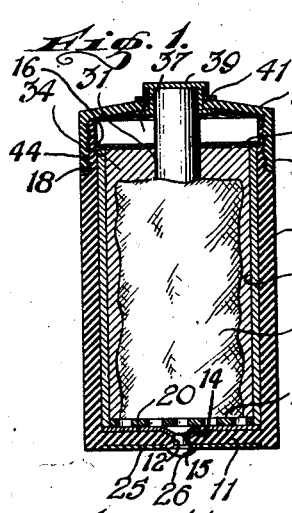
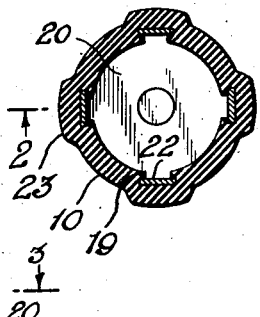
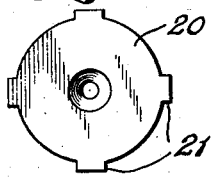
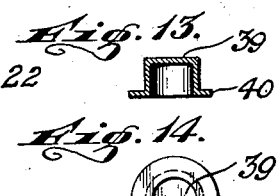
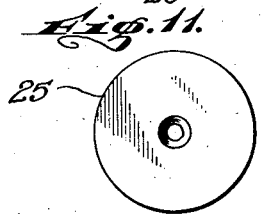
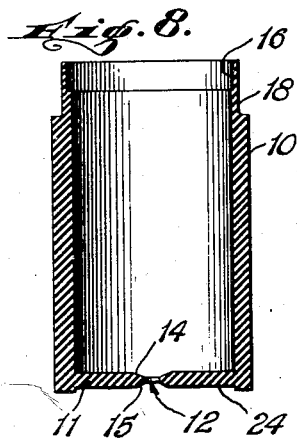
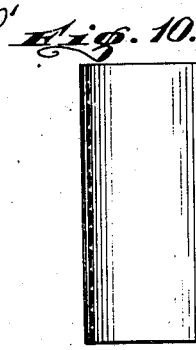
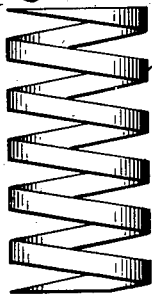
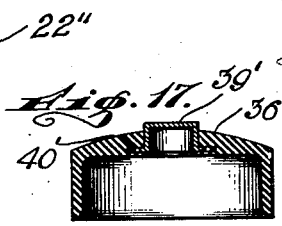
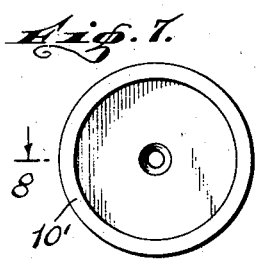
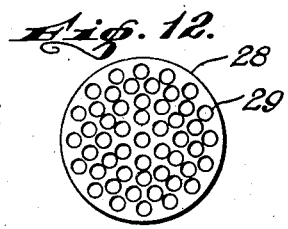
INVENTOR
WANDA L. PAUL
BY H. M. Kilpatrick
ATTORNEY Patented Apr. 29, 1947

2,419,589

UNITED STATES PATENT OFFICE 2,419,589

LEAKPROOF DRY CELL

Wanda L. Paul, New York, N. Y.

Application May 6, 1944, Serial No. 534,451

3 Claims. (Cl. 136—133)

This invention relates to cells and to means for preventing loss of electrolyte from so-called dry cells and more particularly to devices for durably enclosing the zinc electrodes of cells to prevent swelling of cells and loss of corrosive gases during the use of the cell.

One object of the invention is to provide an improved device or apparatus of this kind which utilizes a strong, impervious and non-corroding outer casing which will retain its original size and shape throughout the life of the cell.

Other objects of the invention are to provide an improved device of this kind which employs zinc electrodes which can be cut from strip material and which may be corroded though without loss of electrolyte.

Additional objects of the invention are to effect simplicity and efficiency in such methods and apparatus and to provide an extremely simple device or apparatus of this kind which is economical, durable, and reliable in operation, and economical to manufacture and may be used wherever the hitherto known cells are used.

The inventive features for the accomplishment of these an other objects are shown herein in connection with a cell which briefly stated, includes a casing of hard insulating material having a zinc disk disposed on the bottom thereof as an electrode. The area of the electrode is increased by auxiliary electrodes in the form of a strip, coil, or tube in contact with the disk and disposed against the inner wall of the casing.

For an exterior connection to the disk a zinc plate is mounted on the outer face of the casing bottom by rivet means engaging the disk. A porous diaphragm disposed on the upper face of the disk separates the latter from a positive element comprising a carbon rod projecting from the casing. On the upper end of the casing is tightly mounted a closure engaging a terminal cap secured fast thereon by a retaining ring.

In the accompanying drawing, showing, by way of example, several of many possible embodiments of the invention, Fig. 1 is a longitudinal vertical sectional view, showing the assembled cell;

Fig. 2 is a longitudinal sectional view, partly in elevation, showing the cell casing, the section being taken substantially on the line 2—2 of Fig. 3, looking in the direction of the arrows of said line;

Fig. 3 is a transverse horizontal sectional view, partly in elevation, showing the cell casing, the section being taken substantially on the line 3—3 of Fig. 2, looking in the direction of the arrows of said line;

Fig. 4 is a plan showing the zinc disk;

Fig. 5 is a front elevation showing the zinc strip;

Fig. 6 is an end elevation showing the strip of Fig. 6;

Fig. 7 is a bottom elevation showing the casing in another form;

Fig. 8 is a longitudinal vertical sectional view, showing the casing of Fig. 7, the section being taken substantially on the line 8—8 of Fig. 7, looking in the direction of the arrows of said line;

Fig. 9 is a side elevation showing the electrode in the form of a helical coil;

Fig. 10 is a side elevation showing the electrode in the form of a tube;

Fig. 11 is a plan showing the zinc plate;

Fig. 12 is a plan showing the porous diaphragm;

Figs. 13 and 14 are a sectional view and a bottom elevation respectively showing the terminal cap;

Figs. 15 and 16 are a sectional view and plan respectively showing the terminal cap ring;

Fig. 17 is a sectional view showing another form of the terminal cap mounted in the closure; and Fig. 18 is a plan showing the terminal cap of Fig. 17.

My invention as shown in the form of a dry cell as shown in Fig. 1 comprises a hollow cylindrical casing 10 of Bakelite, phenol-formaldehyde plastic or other suitable strong and impervious material, open at the upper end and having a bottom 11 provided with a central aperture 12 preferably countersunk at the inner and outer faces of the bottom as at 14, 15 similar to that shown in Fig. 8. The upper end of the casing is provided with peripheral internal and external rabbet grooves 16, 18 the latter extending nearer the bottom of the casing, and the inner wall of the casing is provided with a plurality of undercut grooves 19 extending longitudinally from the upper end of the casing to the bottom thereof. A zinc disk 20 disposed on said bottom and having radial projections 21 reaching into said undercut grooves where they are in contact with strips of zinc 22 is disposed therein to form a composite electrode presenting active faces toward the axis of the casing. The casing portion including the grooves is preferably thickened as at 23.

The zinc strips may be replaced by a long helically coiled strip 22' disposed within the casing against the disk 20, and against the inner walls of the casing. The strip may be also replaced by an ordinary zinc cylinder or tube 22" open at both ends. When a helical or cylindrical electrode is employed the undercut grooves 19 in the casing may be omitted as in Fig. 8, though their presence will enable electrolyte, described later, to come in contact with the outer surface of the zinc especially when a helical strip is used. If the grooves 19 are omitted, the projections 21 on the disk are preferably omitted.

In some instances especially where a high internal resistance of the cell is not undesirable the disk 20 alone may be used as the electrode.

The exterior of the casing bottom is preferably provided with a large circular shallow recess 24 in which a circular metallic plate 25 is secured preferably flush with the lower end of the casing by means of a rivet 26 of conducting material passing gas tight through the zinc plate, aperture and zinc disk. The plate and rivet are preferably of zinc to prevent corrosion due to electrolytic action.

A porous diaphragm disk 28 having perforations 29 therethrough is disposed on the upper face of the zinc disk and engages the inner curved faces of the casing walls to separate the zinc disk from a positive element 30 within the casing. The element comprises a carbon rod 31 disposed coaxially in the casing and projecting upwardly therefrom and a depolarizing mix 32 around the rod. A porous bag or blotting paper wrapping around the mix prevents contact of the latter with the zinc electrode in the usual manner but permits diffusion of a solution of electrolyte 34 in the annular space between the electrode and positive element so as to come in active contact with the electrode and element. A non-conducting impervious paper washer 35 is disposed in the internal rabbet groove 16 and preferably engages the outer ends of the zinc strips to hold them in contact with the disk and surrounds tightly the outer end of the rod to prevent escape of the electrolyte from the interior of the casing.

An annular closure or cover cap 36 of strong impervious plastic is secured tight on the upper end portion of the casing and spaced from the washer to form a gas space 37 and provided with a down-turned outer flange 38 engaged in the external rabbet groove 18 where the connection is made gastight by means of impervious cement between the inner face of the flange and the outer face of the external rabbet groove. A terminal cap 39 on the outer end of the carbon rod passes through the closure and is provided with an internal outstanding flange 40 tightly engaged against the inner face of the inner peripheral marginal portions of the closure and held there by a ring 41 tightly engaged around the outer end portion of the terminal cap and having a flange 42 tightly engaging the outer face of the closure. The peripheral portions of the terminal cap are swaged over the outer face of the ring whereby the terminal cap and ring serve as a brad or rivet sealing the aperture of the annular cover and as a terminal contact.

The terminal cap may be shortened as shown at 39' in Fig. 17 and the flange 40' embedded in the inner marginal portion of the closure 39'. Greater tightness is attained if the flange 40' is provided with perforations 43. If gas pressures within the cell are not large the perforations 43 may be omitted. However, perforations 43 are desirable for when the flange is cast in the closure the plastic flows into the perforations from each side of the flange and shrinks to act as rivets holding the plastic tightly against each face of the flange.

The closure may be more tightly held on the casing by means of threads 44, Fig. 1, or the threads may be omitted as shown in Figs. 8 and 17.

The invention claimed is:

1. A dry cell comprising a hollow cylindrical casing of strong impervious insulating material, open at the upper end and having a bottom at its lower end; a zinc disk disposed on said bottom and a zinc helical strip disposed against the inner walls of the casing and in contact with the disk to form a composite electrode presenting active faces toward the axis of the casing; the exterior of said bottom being provided with a large circular shallow recess; a circular zinc plate in said recess and flush with the lower end of the casing; and a terminal rivet passing gas-tight through the zinc plate, casing bottom and zinc disk.

2. A dry cell comprising a hollow cylindrical plastic casing open at the upper end and having a bottom provided with a central aperture countersunk at the inner and outer faces of the bottom; the upper end of the casing being provided with peripheral internal and external rabbet grooves, the latter extending nearer the bottom of the casing, the inner wall of the casing being provided with a plurality of undercut grooves extending longitudinally from the upper end of the casing to the bottom thereof; a zinc disk disposed on said bottom and having radial projections reaching into said undercut grooves; strips of zinc disposed in the undercut grooves and in contact with the projections to form a composite electrode presenting active faces toward the axis of the casing; the exterior of said bottom being provided with a large circular shallow recess; a circular zinc plate in said recess and flush with the lower end of the casing; a rivet passing gas-tight through the zinc plate, aperture, and zinc disk.

3. A dry cell comprising a cylindrical casing having an open upper end; a carbon rod disposed coaxially in the casing and projecting upwardly therefrom; an annular cover cap of strong impervious plastic, tight on the upper portion of the casing; and a terminal cap on the outer end of the carbon rod and passing through the cover cap and provided with an outstanding flange tightly engaging the inner face of the inner peripheral marginal portion of the cover cap; and a flanged ring tightly engaged around the outer end portion of the terminal cap with the flange tightly engaging the outer face of the cover cap, peripheral portions of the terminal cap being swaged over the outer face of the ring whereby the terminal cap and ring serve as a rivet sealing the aperture of the annular cover and as a terminal contact.

WANDA L. PAUL.

REFERENCES CITED

The following references are of record in the file of this patent:

UNITED STATES PATENTS

| Number | Name | Date |
|---|---|---|
| 720,592 | Kohn | Feb. 17, 1903 |
| 2,315,592 | Cargill | Apr. 6, 1943 |
| 572,285 | Willms | Dec. 1, 1896 |
| 2,149,169 | Gelardin | Feb. 28, 1939 |
| 2,198,423 | Anthony | Apr. 23, 1940 |
| 406,223 | Lee | July 2, 1889 |
| 1,140,826 | Hoppie | May 25, 1915 |
| 1,263,500 | Willard | Apr. 23, 1918 |
| 1,526,208 | Gill | Feb. 10, 1925 |
| 1,552,414 | Apostoloff | Sept. 8, 1925 |
| 2,346,640 | Anthony | Apr. 18, 1944 |

FOREIGN PATENTS

| Number | Country | Date |
|---|---|---|
| 9,948 | Australia | 1932 |
| 360,769 | German | Oct. 6, 1922 |